(12) United States Patent
Whitehill et al.

(10) Patent No.: US 7,042,867 B2
(45) Date of Patent: May 9, 2006

(54) SYSTEM AND METHOD FOR DETERMINING PHYSICAL LOCATION OF A NODE IN A WIRELESS NETWORK DURING AN AUTHENTICATION CHECK OF THE NODE

(75) Inventors: Eric A. Whitehill, Fort Wayne, IN (US); Eric D. White, Altamonte Springs, FL (US)

(73) Assignee: MeshNetworks, Inc., Maitland, FL (US)

( * ) Notice: Subject to any disclaimer, the term of this patent is extended or adjusted under 35 U.S.C. 154(b) by 27 days.

(21) Appl. No.: 10/270,003

(22) Filed: Oct. 15, 2002

(65) Prior Publication Data

US 2004/0028017 A1    Feb. 12, 2004

Related U.S. Application Data

(60) Provisional application No. 60/398,834, filed on Jul. 29, 2002.

(51) Int. Cl.
*H04Q 7/24* (2006.01)
(52) U.S. Cl. ............ 370/338; 455/11.1; 370/352
(58) Field of Classification Search ............ 370/328, 370/329, 338, 332, 320, 345, 310.2, 335, 370/342, 389, 230.1, 254, 280, 248, 401, 370/466, 255, 316, 402, 310, 315, 343, 344, 370/347, 351, 352, 353, 356, 400; 455/456.1, 455/456.2, 456.3, 456.5, 422.1, 435.3, 562.1, 455/562.2, 406, 410, 411, 420, 427, 431, 455/446, 455, 447, 517, 522, 576, 41, 11.1, 455/12.1, 13.1, 16, 41.2; 342/357.08, 357.8, 342/465, 457; 375/133, 346, 380, 354; 702/179; 704/222, 270.1
See application file for complete search history.

(56) References Cited

U.S. PATENT DOCUMENTS

| 4,494,192 A | 1/1985 | Lew et al. ................ 364/200 |
| 4,617,656 A | 10/1986 | Kobayashi et al. ........ 370/74 |
| 4,736,371 A | 4/1988 | Tejima et al. ............. 370/95 |
| 4,742,357 A | 5/1988 | Rackley .................... 342/457 |
| 4,747,130 A | 5/1988 | Ho ........................... 379/269 |

(Continued)

FOREIGN PATENT DOCUMENTS

CA    2132180    3/1996

(Continued)

OTHER PUBLICATIONS

Wong et al., "Soft Handoffs in CDMA Mobile Systems", Dec. 1997, IEEE Personal Communications.

(Continued)

*Primary Examiner*—Phirin Sam
(74) *Attorney, Agent, or Firm*—Randi L. Karpinia; Joseph J. Buczynski

(57) ABSTRACT

A system and method for providing security to a wireless network by using a mobile node's location as a parameter for deciding if access is to be given to the node. The system and method employ access points, wireless routers and mobile nodes, each including at least one transceiver adapted to transmit and receive communication signals to and from other wireless routers, mobile nodes and other mobile access points. Each access point is connected to a network management system which allows enhanced network monitoring and control. Each network node includes technology which may determine an absolute node location containing latitude, longitude and altitude of a node, or a relative node location containing the distance and angle between nodes, or a combination of both absolute and relative location data.

30 Claims, 7 Drawing Sheets

U.S. PATENT DOCUMENTS

| | | | |
|---|---|---|---|
| 4,910,521 A | 3/1990 | Mellon | 342/45 |
| 5,034,961 A | 7/1991 | Adams | 375/130 |
| 5,068,916 A | 11/1991 | Harrison et al. | 455/39 |
| 5,231,634 A | 7/1993 | Giles et al. | 370/95.1 |
| 5,233,604 A | 8/1993 | Ahmadi et al. | 370/60 |
| 5,241,542 A | 8/1993 | Natarajan et al. | 370/95.3 |
| 5,317,566 A | 5/1994 | Joshi | 370/60 |
| 5,392,450 A | 2/1995 | Nossen | 455/12.1 |
| 5,412,654 A | 5/1995 | Perkins | 370/94.1 |
| 5,424,747 A | 6/1995 | Chazelas | 342/70 |
| 5,502,446 A * | 3/1996 | Denninger | 342/357.08 |
| 5,502,722 A | 3/1996 | Fulghum | 370/69.1 |
| 5,517,491 A | 5/1996 | Nanni et al. | 370/29 |
| 5,555,425 A | 9/1996 | Zeller et al. | 395/800 |
| 5,555,540 A | 9/1996 | Radke | 370/16.1 |
| 5,572,528 A * | 11/1996 | Shuen | 370/402 |
| 5,615,212 A | 3/1997 | Ruszczyk et al. | 370/433 |
| 5,618,045 A | 4/1997 | Kagan et al. | 463/40 |
| 5,621,732 A | 4/1997 | Osawa | 370/79 |
| 5,623,495 A | 4/1997 | Eng et al. | 370/397 |
| 5,627,976 A | 5/1997 | McFarland et al. | 395/308 |
| 5,631,897 A | 5/1997 | Pacheco et al. | 370/237 |
| 5,644,576 A | 7/1997 | Bauchot et al. | 370/437 |
| 5,652,751 A | 7/1997 | Sharony | 370/227 |
| 5,680,392 A | 10/1997 | Semaan | 370/261 |
| 5,684,794 A | 11/1997 | Lopez et al. | 370/337 |
| 5,687,194 A | 11/1997 | Paneth et al. | 375/283 |
| 5,696,903 A | 12/1997 | Mahany | 395/200.58 |
| 5,701,294 A | 12/1997 | Ward et al. | 370/252 |
| 5,706,428 A | 1/1998 | Boer et al. | 395/200 |
| 5,717,689 A | 2/1998 | Ayanoglu | 370/349 |
| 5,745,483 A | 4/1998 | Nakagawa et al. | 370/335 |
| 5,774,876 A | 6/1998 | Wooley et al. | 705/28 |
| 5,781,540 A | 7/1998 | Malcolm et al. | 370/321 |
| 5,787,080 A | 7/1998 | Hulyalkar et al. | 370/348 |
| 5,794,154 A | 8/1998 | Bar-On et al. | 455/509 |
| 5,796,732 A | 8/1998 | Mazzola et al. | 370/362 |
| 5,796,741 A | 8/1998 | Saito et al. | 370/439 |
| 5,805,593 A | 9/1998 | Busche | 370/396 |
| 5,805,842 A | 9/1998 | Nagaraj et al. | 395/306 |
| 5,805,977 A | 9/1998 | Hill et al. | 455/31.3 |
| 5,809,518 A | 9/1998 | Lee | 711/115 |
| 5,822,309 A | 10/1998 | Ayanoglu et al. | 370/315 |
| 5,835,857 A * | 11/1998 | Otten | 455/410 |
| 5,844,905 A | 12/1998 | McKay et al. | 370/443 |
| 5,845,097 A | 12/1998 | Kang et al. | 395/297 |
| 5,857,084 A | 1/1999 | Klein | 395/309 |
| 5,870,350 A | 2/1999 | Bertin et al. | 365/233 |
| 5,877,724 A | 3/1999 | Davis | 342/357 |
| 5,881,095 A | 3/1999 | Cadd | 375/202 |
| 5,881,372 A | 3/1999 | Kruys | 455/113 |
| 5,886,992 A | 3/1999 | Raatikainen et al. | 370/410 |
| 5,896,561 A | 4/1999 | Schrader et al. | 455/67.1 |
| 5,903,559 A | 5/1999 | Acharya et al. | 370/355 |
| 5,909,651 A | 6/1999 | Chander et al. | 455/466 |
| 5,936,953 A | 8/1999 | Simmons | 370/364 |
| 5,943,322 A | 8/1999 | Mayor et al. | 370/280 |
| 5,987,011 A | 11/1999 | Toh | 370/331 |
| 5,987,033 A | 11/1999 | Boer et al. | 370/445 |
| 5,991,279 A | 11/1999 | Haugli et al. | 370/311 |
| 6,028,853 A | 2/2000 | Haartsen | 370/338 |
| 6,029,217 A | 2/2000 | Arimilli et al. | 710/107 |
| 6,034,542 A | 3/2000 | Ridgeway | 326/39 |
| 6,034,950 A * | 3/2000 | Sauer et al. | 370/310.2 |
| 6,044,062 A | 3/2000 | Brownrigg et al. | 370/238 |
| 6,047,330 A | 4/2000 | Stracke, Jr. | 709/238 |
| 6,052,594 A | 4/2000 | Chuang et al. | 455/450 |
| 6,052,752 A | 4/2000 | Kwon | 710/126 |
| 6,064,626 A | 5/2000 | Stevens | 365/233 |
| 6,067,291 A | 5/2000 | Kamerman et al. | 370/338 |
| 6,067,297 A | 5/2000 | Beach | 370/389 |
| 6,078,566 A | 6/2000 | Kikinis | 370/286 |
| 6,088,337 A * | 7/2000 | Eastmond et al. | 370/280 |
| 6,104,712 A | 8/2000 | Robert et al. | 370/389 |
| 6,108,738 A | 8/2000 | Chambers et al. | 710/113 |
| 6,115,580 A | 9/2000 | Chuprun et al. | 455/1 |
| 6,122,690 A | 9/2000 | Nannetti et al. | 710/102 |
| 6,130,881 A | 10/2000 | Stiller et al. | 370/238 |
| 6,132,306 A | 10/2000 | Trompower | 453/11.1 |
| 6,163,699 A | 12/2000 | Naor et al. | 455/453 |
| 6,178,337 B1 | 1/2001 | Spartz et al. | 455/561 |
| 6,192,053 B1 | 2/2001 | Angelico et al. | 370/448 |
| 6,192,230 B1 | 2/2001 | Van Bokhorst et al. | 455/343 |
| 6,208,870 B1 | 3/2001 | Lorello et al. | 455/466 |
| 6,222,463 B1 | 4/2001 | Rai | 340/928 |
| 6,223,240 B1 | 4/2001 | Odenwald et al. | 710/129 |
| 6,240,294 B1 | 5/2001 | Hamilton et al. | 455/456 |
| 6,246,875 B1 | 6/2001 | Seazholtz et al. | 455/432 |
| 6,249,516 B1 | 6/2001 | Brownrigg et al. | 370/338 |
| 6,275,707 B1 | 8/2001 | Reed et al. | 455/456 |
| 6,285,892 B1 | 9/2001 | Hulyalkar | 455/574 |
| 6,304,556 B1 | 10/2001 | Haas | 370/254 |
| 6,327,300 B1 | 12/2001 | Souissi et al. | 375/219 |
| 6,349,091 B1 | 2/2002 | Li | 370/238 |
| 6,349,210 B1 | 2/2002 | Li | 455/450 |
| 6,359,872 B1 | 3/2002 | Mahany et al. | 370/338 |
| 6,377,636 B1 * | 4/2002 | Paulraj et al. | 375/346 |
| 6,404,756 B1 * | 6/2002 | Whitehill et al. | 370/338 |
| 6,456,599 B1 * | 9/2002 | Elliott | 370/254 |
| 6,505,049 B1 * | 1/2003 | Dorenbosch | 455/456.2 |
| 6,519,464 B1 * | 2/2003 | Santhoff et al. | 455/456.5 |
| 6,539,232 B1 * | 3/2003 | Hendrey et al. | 455/456.1 |
| 6,574,266 B1 * | 6/2003 | Haartsen | 375/133 |
| 6,618,690 B1 * | 9/2003 | Syrjarinne | 702/179 |
| 6,625,135 B1 * | 9/2003 | Johnson et al. | 370/332 |
| 6,697,649 B1 * | 2/2004 | Bennett et al. | 455/574 |
| 6,728,545 B1 * | 4/2004 | Belcea | 455/456.2 |
| 6,744,740 B1 * | 6/2004 | Chen | 370/255 |
| 6,826,385 B1 * | 11/2004 | Kujala | 455/13.1 |
| 2001/0053699 A1 | 12/2001 | McCrady et al. | 455/513 |
| 2002/0131386 A1* | 9/2002 | Gwon | 370/338 |
| 2003/0012168 A1* | 1/2003 | Elson et al. | 370/338 |
| 2003/0035437 A1* | 2/2003 | Garahi et al. | 370/465 |
| 2003/0053424 A1* | 3/2003 | Krishnamurthy et al. | 370/316 |
| 2003/0073406 A1* | 4/2003 | Benjamin et al. | 455/41 |
| 2003/0091010 A1* | 5/2003 | Garahi et al. | 370/338 |
| 2003/0118015 A1* | 6/2003 | Gunnarsson et al. | 370/389 |
| 2003/0156558 A1* | 8/2003 | Cromer et al. | 370/331 |
| 2003/0177219 A1* | 9/2003 | Taib et al. | 709/223 |
| 2003/0232620 A1* | 12/2003 | Runkle et al. | 455/423 |
| 2003/0233580 A1* | 12/2003 | Keeler et al. | 713/201 |
| 2003/0235175 A1* | 12/2003 | Naghian et al. | 370/338 |
| 2004/0203380 A1* | 10/2004 | Hamdi et al. | 455/41.2 |

FOREIGN PATENT DOCUMENTS

| | | |
|---|---|---|
| EP | 0513841 A2 | 11/1992 |
| EP | 0627827 A2 | 12/1994 |
| EP | 0924890 A2 | 6/1999 |
| FR | 2683326 | 7/1993 |
| WO | WO 9608884 | 3/1996 |
| WO | WO 9724005 | 7/1997 |
| WO | WO 9839936 | 9/1998 |
| WO | WO 9912302 | 3/1999 |
| WO | WO 0034932 | 6/2000 |
| WO | WO 0110154 | 2/2001 |
| WO | WO 0133770 | 5/2001 |
| WO | WO 0135567 | 5/2001 |
| WO | WO 0137481 | 5/2001 |
| WO | WO 0137482 | 5/2001 |
| WO | WO 0137483 | 5/2001 |
| WO | WO 0235253 | 5/2002 |

OTHER PUBLICATIONS

Wong et al., "A Pattern Recognition System for Handoff Algorithms", Jul. 2000, IEEE Journal on Selected Areas in Communications, vol. 18, No. 7.

Andras G. Valko, "Cellular IP: A New Approach to Internet Host Mobility", Jan. 1999, ACM Computer Communication Review.

Richard North, Dale Bryan and Dennis Baker, "Wireless Networked Radios: Comparison of Military, Commercial, and R&D Protocols", Feb. 28-Mar. 3, 1999, 2nd Annual UCSD Conference on Wireless Communications, San Diego CA.

Benjamin B. Peterson, Chris Kmiecik, Richard Hartnett, Patrick M. Thompson, Jose Mendoza and Hung Nguyen, "Spread Spectrum Indoor Geolocation", Aug. 1998, Navigation: Journal of the Institute of Navigation, vol. 45, No. 2, summer 1998.

Josh Broch, David A. Maltz, David B. Johnson, Yih-Chun Hu and Jorjeta Jetcheva, "A Performance Comparison of Multi-Hop Wireless Ad Hoc Network Routing Protocols", Oct. 25-30, 1998, Proceedings of the 4th Annual ACM/IEEE International Conference on Mobile Computing and Networking.

C. David Young, "USAP: A Unifying Dynamic Distributed Multichannel TDMA Slot Assignment Protocol".

Chip Elliott and Bob Heile, "Self-Organizing, Sef-Healing Wireless Networks", 2000 IEEE.

J.J. Garcia-Luna-Aceves and Asimakis Tzamaloukas, "Reversing the Collision-Avoidance Handshake in Wireless Networks".

J.J. Garcia-Luna-Aceves and Marcelo Spohn, "Transmission-Efficient Routing in Wireless Networks Using Link-State Information".

J.J. Garcia-Luna-Aceves and Ewerton L. Madruga, "The Core-Assisted Mesh Protocol", Aug. 1999, IEEE Journal on Selected Areas in Communications, vol. 17, No. 8.

Ad Kamerman and Guido Aben, "Net Throughput with IEEE 802.11 Wireless LANs".

J.R. McChesney and R.J. Saulitis, "Optimization of an Adaptive Link Control Protocol for Multimedia Packet Radio Networks".

Ram Ramanathan and Regina Rosales-Hain, "Topology Control of Multihop Wireless Networks using Transmit Power Adjustment".

Ram Ramanathan and Martha E. Steenstrup, "Hierarchically-Organized, Multihop Mobile Wireless Networks for Quality-of-Service Support".

Zhenyu Tang and J.J. Garcia-Luna-Aceves, "Collision-Avoidance Transmission Scheduling for Ad-Hoc Networks".

George Vardakas and Wendell Kishaba, "QoS Networking With Adaptive Link Control and Tactical Multi-Channel Software Radios".

* cited by examiner

SYSTEM AND METHOD FOR DETERMINING PHYSICAL LOCATION OF A NODE IN A WIRELESS NETWORK DURING AN AUTHENTICATION CHECK OF THE NODE

This application claims benefit under 35 U.S.C. §119(e) from U.S. provisional patent application Ser. No. 60/398,834 entitled "A System And Method For Determining Physical Location Of A Node In A Wireless Network During An Authentication Check Of The Node", filed Jul. 29, 2002, the entire contents of which is incorporated herein by reference.

BACKGROUND OF THE INVENTION

1. Field of the Invention

The present invention relates to a system and method for providing security for a wireless network, such as an ad-hoc wireless communications network, based on the position information relating to mobile nodes. More particularly, the present invention relates to a system and method for trusted infrastructure devices to compute the location of a mobile node in a wireless communications network, such as an ad-hoc terrestrial wireless communications network, during the authentication process.

2. Description of the Related Art

Wireless communications networks, such as mobile wireless telephone networks, have become increasingly prevalent over the past decade. These wireless communications networks are commonly referred to as "cellular networks" because the network infrastructure is arranged to divide the service area into a plurality of regions called "cells".

Specifically, a terrestrial cellular network includes a plurality of interconnected base stations that are distributed geographically at designated locations throughout the service area. Each base station includes one or more transceivers that are capable of transmitting and receiving electromagnetic signals, such as radio frequency (RF) communications signals, to and from user nodes, such as wireless telephones, located within the base station coverage area. The communications signals include, for example, voice data that has been modulated according to a desired modulation technique and transmitted as data packets. As can be appreciated by one skilled in the art, the transceiver and user nodes transmit and receive such data packets in multiplexed format, such as time-division multiple access (TDMA) format, code-division multiple access (CDMA) format, or frequency-division multiple access (FDMA) format, which enables a single transceiver at the base station to communicate simultaneously with several user nodes in it's coverage area.

In recent years, a type of mobile communications network known as an "ad-hoc" network has been developed for use by the military. In this type of network, each user node is capable of operating as a base station or router for the other user nodes, thus eliminating the need for a fixed infrastructure of base stations. Details of an ad-hoc network are set forth in U.S. Pat. No. 5,943,322 to Mayor, the entire content of which is incorporated herein by reference.

More sophisticated ad-hoc networks are also being developed which, in addition to enabling user nodes to communicate with each other as in a conventional ad-hoc network, further enable the user nodes to access a fixed network and thus communicate with other user nodes, such as those on the public switched telephone network (PSTN), and on other networks such as the Internet. Details of these types of ad-hoc networks are described in U.S. patent application Ser. No. 09/897,790 entitled "Ad Hoc Peer-to-Peer Mobile Radio Access System Interfaced to the PSTN and Cellular Networks", filed on Jun. 29, 2001, and in U.S. patent application Ser. No. 09/815,157 entitled "Time Division Protocol for an Ad-Hoc, Peer-to-Peer Radio Network Having Coordinating Channel Access to Shared Parallel Data Channels with Separate Reservation Channel", filed on Mar. 22, 2001, the entire content of each being incorporated herein by reference.

In either conventional wireless communications networks, or in ad-hoc wireless communications networks, it may be necessary or desirable to know or determine the geographic location of user nodes. Different types of location determining services and techniques for wireless communications networks are described in a publication by Nokia which can be found on the Nokia website at "www.nokia.com/press/background/pdf/mlbs.pdf", the entire content of which being incorporated herein by reference. In particular, the Nokia document states that location identification services are currently provided in wireless communications networks based on three major technologies. One of these technologies uses cell identification combined with Round Trip Time (RTT), Timing Advance (TA) and Measured Signal level (RX level), Time Difference of Arrival (TDOA) and Angle Of Arrival (AOA) techniques, the details of which can be appreciated by one skilled in the art. A second technology uses cellular signal timing based methods for code division multiple access (CDMA) and wideband code division multiple access (WCDMA). The third technology described in the Nokia document employs Global Positioning System (GPS) techniques.

Another list of methods and techniques currently used in the wireless communications industry for providing location services can be found at "www.911dispatch.com/911_file/location tech.html", the entire content of which being incorporated herein by reference. Although the GPS technique is the last technique mentioned in this list, it is generally viewed as being more accurate than all of the other methods. Further details and descriptions of GPS based methods are set forth in a publication by J. J. Spilker Jr. entitled "Satellite Constellation and Geometric Dilution of Precision", in a publication by P. Axelrad et al. entitled "GPS Navigation Algorithms", in a publication by Bradford W. Parkinson entitled "GPS Error Analysis", and in a publication by N. Ashby et al. Entitled "Introduction to Relativistic Effects on the Global Positioning System", each found in "GPS—Theory and Applications", American Institute of Astronautics, 1996, the entire content of each being incorporated herein by reference.

Despite the fact that the GPS technique has been in use for a considerable period of time and most of the world's navigation relies on this technique, the GPS technique is very susceptible to errors in measurement. Therefore, the GPS technique is capable of providing location determination results with very high accuracy only after performing a relatively large number of measurements to remove such errors. A description of the shortcomings of GPS is set forth in a document by IMA entitled "Mathematical Challenges in Global Positioning Systems (GPS)" which can be found at "www.ima.umn.edu/gps", the entire content of this document being incorporated herein by reference. Certain other tests also demonstrate that the GPS technique is unsuitable for terrestrial-based networks.

In addition, other methods and techniques which do not use GPS satellites for determining mobile station locations in a wireless communications network typically require that the signal from the mobile station be received by at least two cell sites that can measure and process the delay between signal arrivals, identify the direction of the signal based on "path signature", and determine the distance between mobile station and the cell towers. In all of these methods, information processing is executed in a designated central processing unit (CPU) which is typically located at a cell tower next to the base station (BTS). Also, most of these methods were designed to comply with E911 requirements without requiring that excessive modifications be made to existing wireless communications systems. Examples of other location determining techniques are set forth in a document by CERN European Organization for Nuclear Research, which can be found at "rkb.home.cern.ch/rkb/ANI16pp/node98.html#SECTION00098000000000000000", in a document by Wendy J Woodbury Straight entitled "Exploring a New Reference System", which can be found at "menstorsoftwareince.com/profile/newref.html", and in a document entitled "An Introduction to SnapTrac Server-Aided GPS Technology", which can be found at "www.s-naptrack.com/pdf/ion.pdf", the entire content of each being incorporated herein by reference. Additional details may also be found in U.S. patent application Ser. No. 09/988,001 entitled "A System and Method for Computing the Location of a Mobile Terminal in a Wireless Communications Network", filed on Nov. 16, 2001, which describes a system and method for determining location with the use of technologies such as GPS, the entire content being incorporated herein by reference.

Accordingly, a need exists for a system and method for determining the location of a mobile user node in a wireless communications network by trusted infrastructure devices to determine if the device is physically within a predetermined "safe zone", and provide access to the network based on this location determination.

SUMMARY OF THE INVENTION

An object of the present invention is to provide a system and method for determining if a mobile node is physically located within a predetermined area of coverage. This may be accomplished with either absolute latitude/longitude location, or by a relative location to a known piece of infrastructure.

Another object of the present invention is to provide a system and method for providing network access to a mobile node based on determined location.

These and other objects are substantially achieved by providing a system and method for obtaining the location of a node in a wireless communications network and using the location information when determining if the node should be allowed access to the network. The wireless communications network can be an ad-hoc wireless communications network with each node and reference node being adapted to operate in the ad-hoc wireless communications network. The system and method further performs the operation of estimating a respective distance from the node to each of the reference nodes based on the respective signals received at the node, calculating a respective simulated pattern, such as a sphere or circle about each of the respective reference nodes based on the respective distance from the node to each respective reference node and the respective locations of the respective reference nodes, estimating a location at which each of the simulated patterns intersect each other, and identifying the estimated location as representing the location of the node. When estimating the respective distances from the node to the reference nodes, the system and method can also perform error minimizing techniques.

The system and method of the present invention determines if a mobile node is physically located in a secure area by the authentication server or it's agent. The location determination agent, at the request of the authentication server, initiates multiple (optimally 4, but at least one) range measurements taken from trusted infrastructure devices (wireless routers or access points) whose physical location is known. These measurements along with the infrastructure device locations are fed into the position algorithm that calculates the mobile node's location. If the result of the algorithm (i.e mobile node's location) is within the physical perimeter defined by the network administrator, then the authentication server receives a confirmation that the mobile node is within the building or area and can proceed with the authentication confirmation.

This algorithm is essentially identical to the location calculation algorithm that a mobile node may perform in other applications. However, in an embodiment of the present invention, all measurements are under the physical control of assets owned by the network administrator. Also, the position algorithm used is under the control of the trusted authentication server, and avoids relying on the mobile node to provide a valid answer.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Wireless nodes wishing to obtain access to an enterprise LAN are typically required to authenticate themselves via the IP standard. Although this verifies that the user has the required challenge information, it does not prevent a computer that has been compromised from accessing the network. Due to the wireless interface, a user doesn't have to be inside the building in order to obtain access. Thus, a compromised computer with a wireless interface could be outside a business' secured environment, such as sitting in a parking lot, and obtain full access to the network services within a business building. Unlike a wired network, the wireless user doesn't need to pass the physical security checks such as a guard desk to obtain building access prior to plugging into the LAN.

In an embodiment of the present invention, or any other wireless technology which could be extended to add a location measurement (e.g. 802.11), the authentication server can request the wireless routers or access points to take time of flight measurements and report either the time of flight or the calculated distance. The authentication server can then determine if the location of the wireless user is within a defined space, such as a building outline, and the authentication server may reject users that are outside the perimeter.

Figure 1:
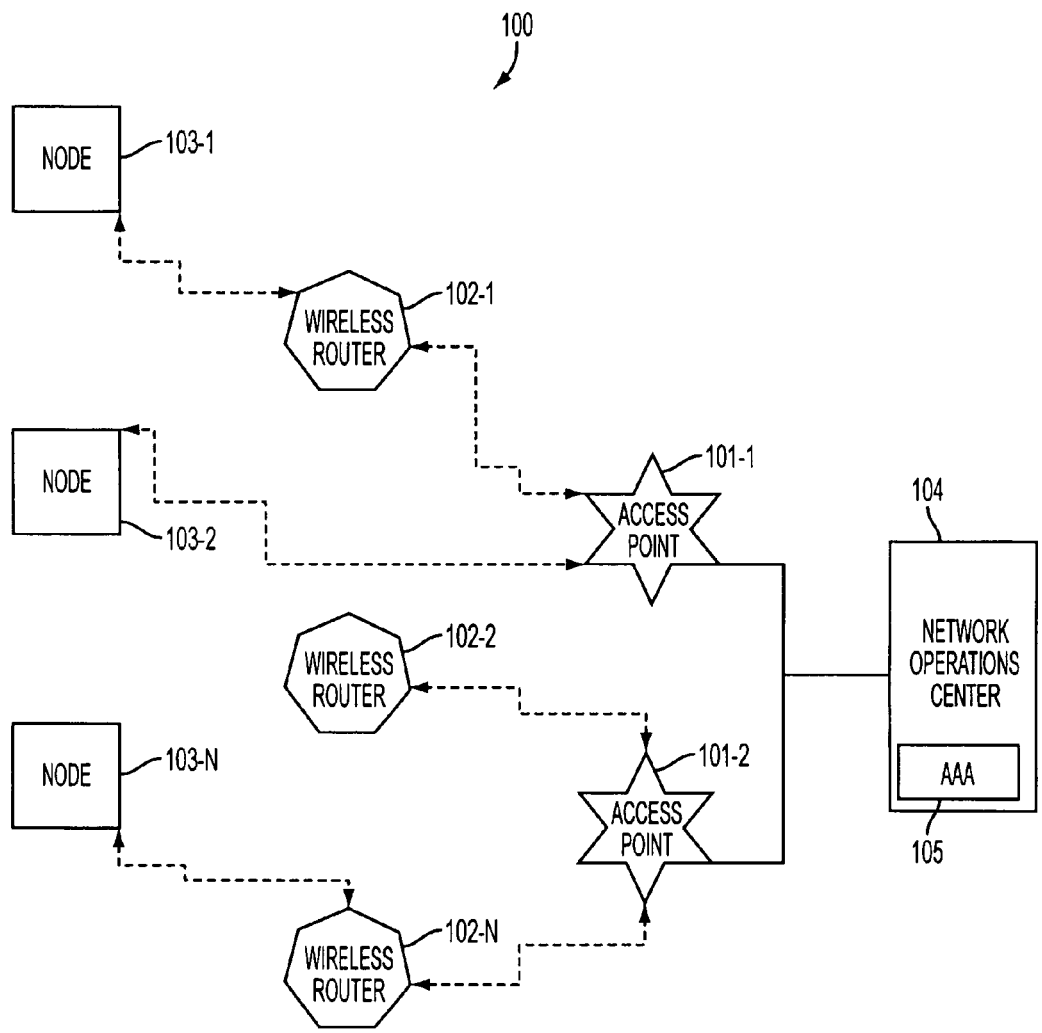
FIG. 1 is a block diagram of an example of an ad-hoc packet switched wireless communications network including a plurality of nodes employing an embodiment of the present invention.

FIG. 1 is a block diagram illustrating an example of a wireless communications network 100 employing mobile access nodes, or terminals, according to an embodiment of the present invention. As shown in FIG. 1, network 100 includes a plurality of devices, including access points (101-1 to 101-2), wireless routers (102-1 to 102-n) and mobile nodes (103-1 to 103-n) on the wireless side of the network, and a Network Operations Center 104 on the wired part of the network. Further details of the network 100 and its operation will now be described. For purposes of this discussion, the terms "user terminal" and "mobile node" will be used interchangeably.

Figure 2:
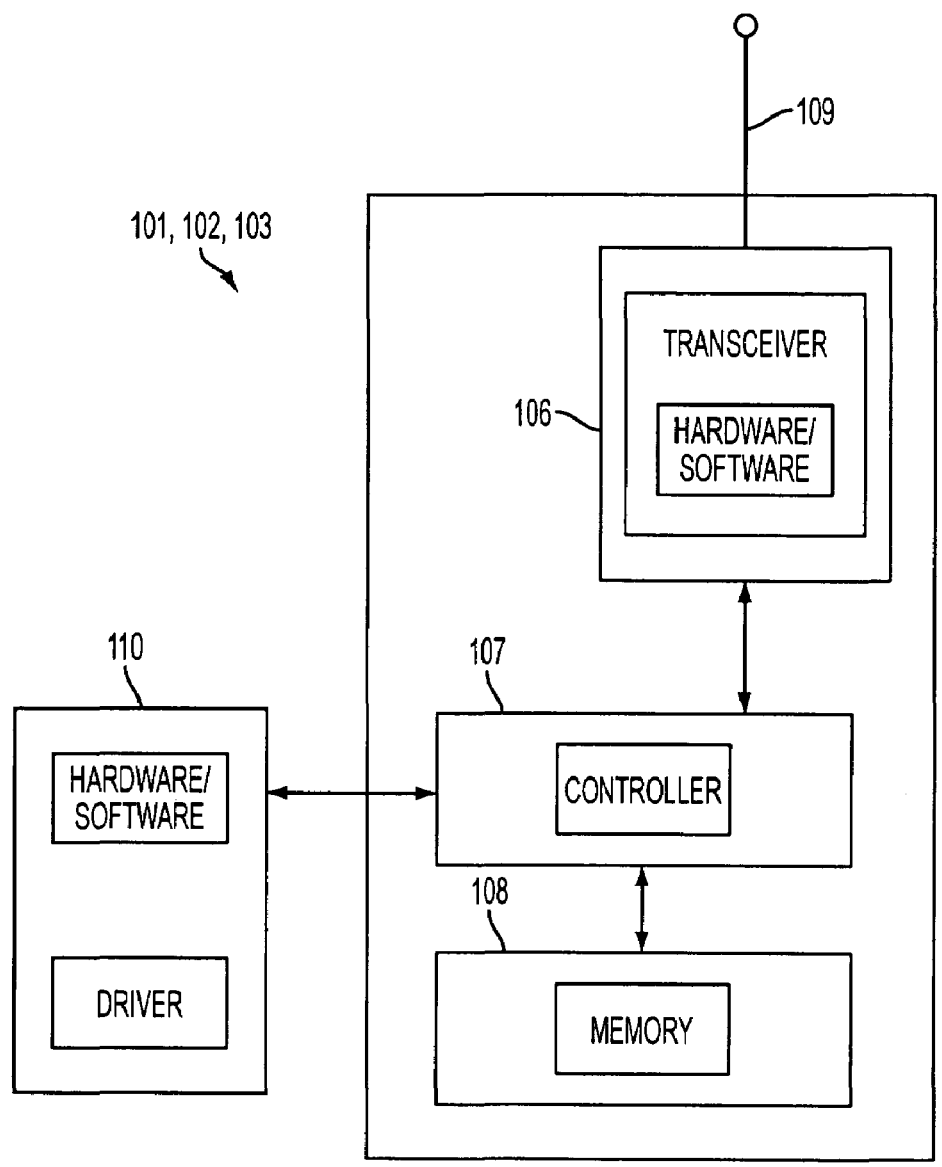
FIG. 2 is a block diagram illustrating an example of a node employed in the network shown in FIG. 1.

As shown in FIG. 2, each access point 101, wireless routers 102 and mobile node 103 includes at least one transceiver 106 and at least one controller 107. Each transceiver 106 is coupled to an antenna 109 and can transmit and receive data packets over any frequency band, for example, over the 2nd Institutional Scientific Medical (ISM) band.

The frequency and modulation scheme used by the transceiver 106 however, do not impact the implementation of the mobile access points 101, wireless routers 102, or nodes 103. Each node 101, 102 and 103 further includes a memory 108, such as a random access memory (RAM), that is capable of storing, among other things, routing information pertaining to itself and other nodes in the network 100. Certain nodes, in particular, mobile nodes 103-1 through 103-n, can be coupled to a host device 110, such as a personal computer (PC), personal data assistant (PDA), or any other suitable device for use by a user.

Each access point 101 and wireless router 102 maintains knowledge of their geographic location. This information may be manually entered, or the devices may include positioning functionality, such as global positioning system (GPS) functionality, differential navigation functionality, or other positioning functionality such as various triangulation techniques as can be appreciated by one skilled in the art, or as described in U.S. patent application Ser. No. 09/988,001 referenced above, and in a U.S. patent application of Eric A. Whitehill, Ser. No. 09/973,799, for "A System And Method For Efficiently Performing Two-Way Ranging To Determine The Location Of A Wireless Node In A Communications Network", filed on Oct. 11, 2001, the entire contents of which being incorporated herein by reference.

Referring to FIG. 1, each node 101, 102 and 103 can be in communication with the Network Operations Center 104, either directly or via other nodes. The Network Communication Center typically consists of equipment used to configure and manage the wireless network, however, for the purposes of this description, only the Authentication, Authorization and Accounting (AAA) server 105 is shown.

Figure 3:
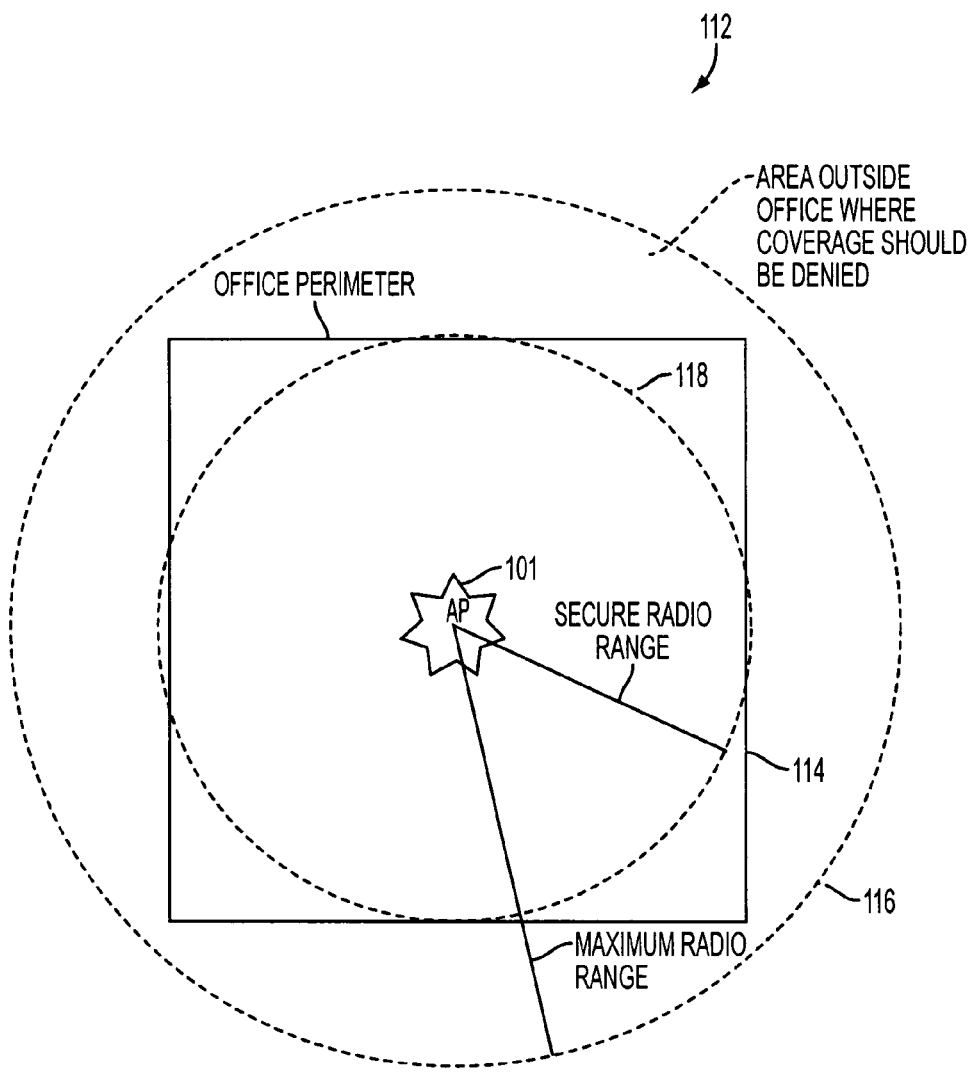
FIG. 3 is a diagram illustrating an example of the maximum and secure ranges of an infrastructure device in accordance with an embodiment of the present invention.

Coverage graph 112 of FIG. 3 shows an example of a network 100 deployment where a single access point 101 is used to provide wireless coverage to an area, such as an office, bounded by an office perimeter 114. In this example, the range of the transceiver 106 of the access point 101, shown bounded by 116, is greater than the perimeter 114 of the office. This could potentially allow an unauthorized user, located beyond the perimeter 114 but within the bounded area 116, to access the network 100. As part of the configuration of the network 100, however, the maximum radius of the transceiver range of access point 101 which guarantees that the user is physically in the secure space is determined. This range, shown bounded by 118, is subsequently used during the authorization process to determine if a node requesting access is within a network access restrict boundary.

Figure 4:
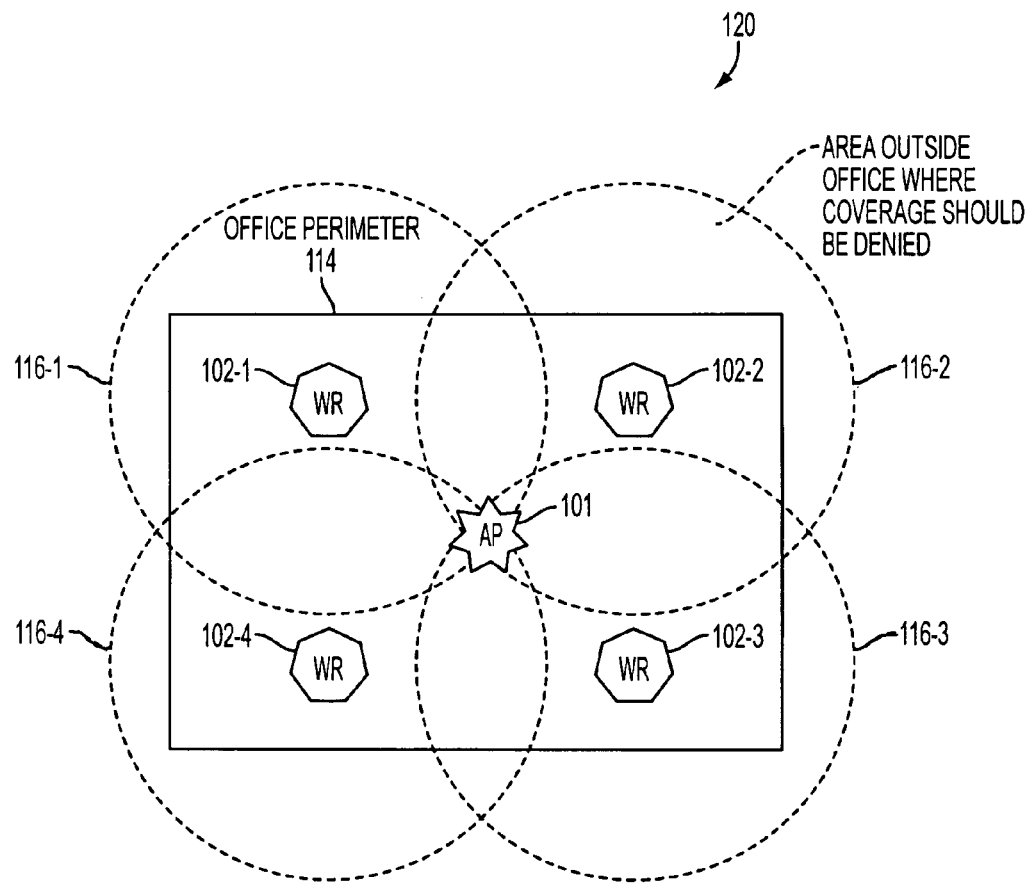
FIG. 4 is a diagram illustrating an example of a network layout with multiple infrastructure devices which have a radio ranges which extend beyond the desired secure area in accordance with an embodiment of the present invention.
Figure 5:
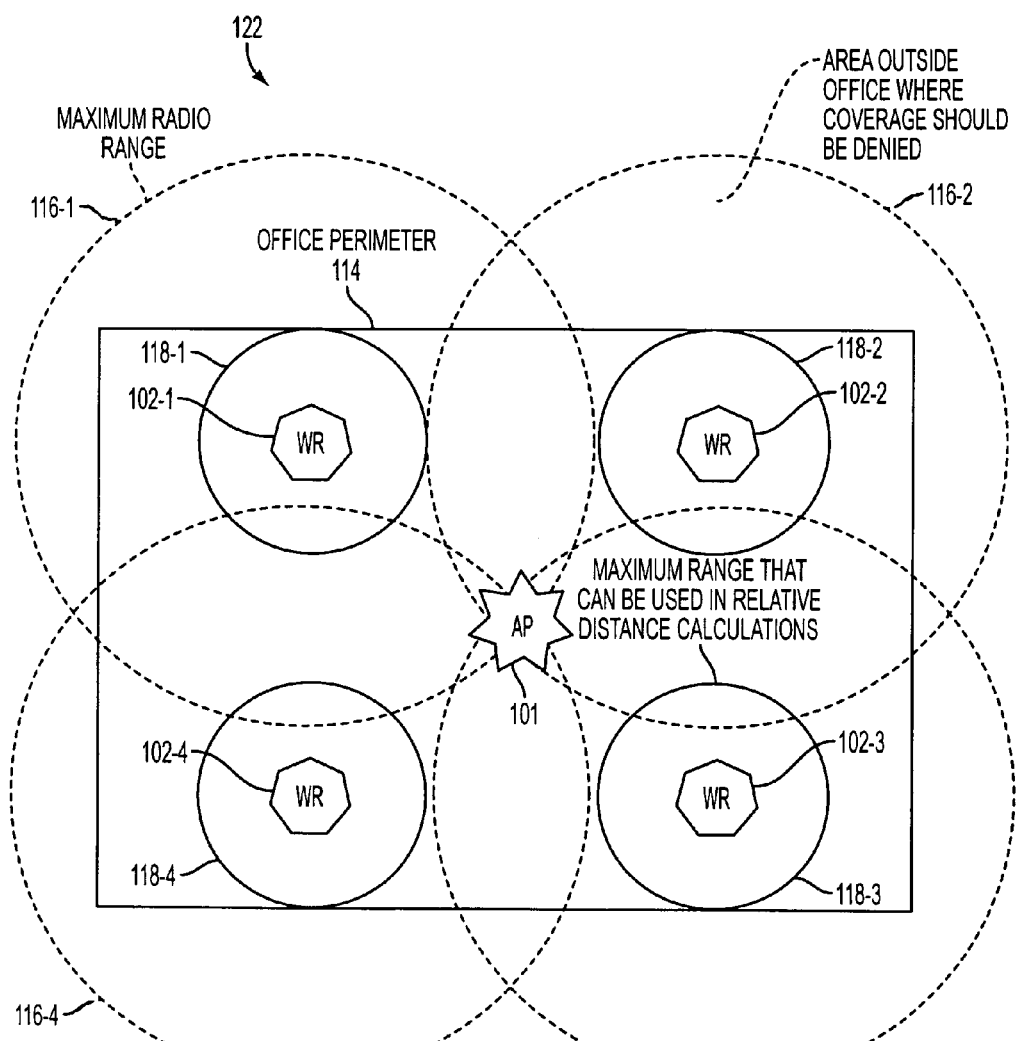
FIG. 5 is a diagram illustrating an example of the secure ranges for each wireless router in FIG. 4 in accordance with an embodiment of the present invention.

Coverage graph 120 of FIG. 4 shows an example of a larger network 100 configuration consisting of a single access point 101 and four wireless routers 102-1, 102-2, 102-3 and 102-4. In this example, the range of the transceiver 106 of each wireless router, shown bounded by 116-1, 116-2, 116-3 and 116-4 respectively, is greater than the perimeter 114 of the office, which could potentially allow an unauthorized user to access the network as described in FIG. 3. Therefore, as in FIG. 3, a maximum radius of each transceiver range which guarantees that the user is physically in the secure space is determined and subsequently used during the authorization process as shown in FIG. 5. As described in greater detail below, in each of FIGS. 3, 4 and 5, nodes requesting access to the network are first located by the fixed devices 101 and 102 within the network. Location of the requesting node is determined by measuring a distance at which the requesting node is located from a fixed device, including both wireless routers 102 and access point 101. If the requesting node is located within the secure space 118, access for the node is allowable on the basis of position.

Due to the placement of the devices in FIGS. 4 and 5 however, simply utilizing the distance of a mobile node to a wireless router may be insufficient for determining if the node is in the secure zone of any one wireless router, shown bounded by 118-1, 118-2, 118-3 and 118-4 respectively. As shown in coverage graph 124 of FIG. 6, mobile nodes 103-2 and 103-3 are both beyond the secure space of each fixed device, however, node 103-2 is located within the perimeter 114 and should be allowed access to the network on the basis of position. As described in greater detail below, the distance between each mobile node 103-1, 103-2 and 103-3 and multiple infrastructure devices must be determined to decide if the "absolute location" of a mobile node is within the perimeter 114, as shown in the coverage graph 124 of FIG. 6.

Figure 6:
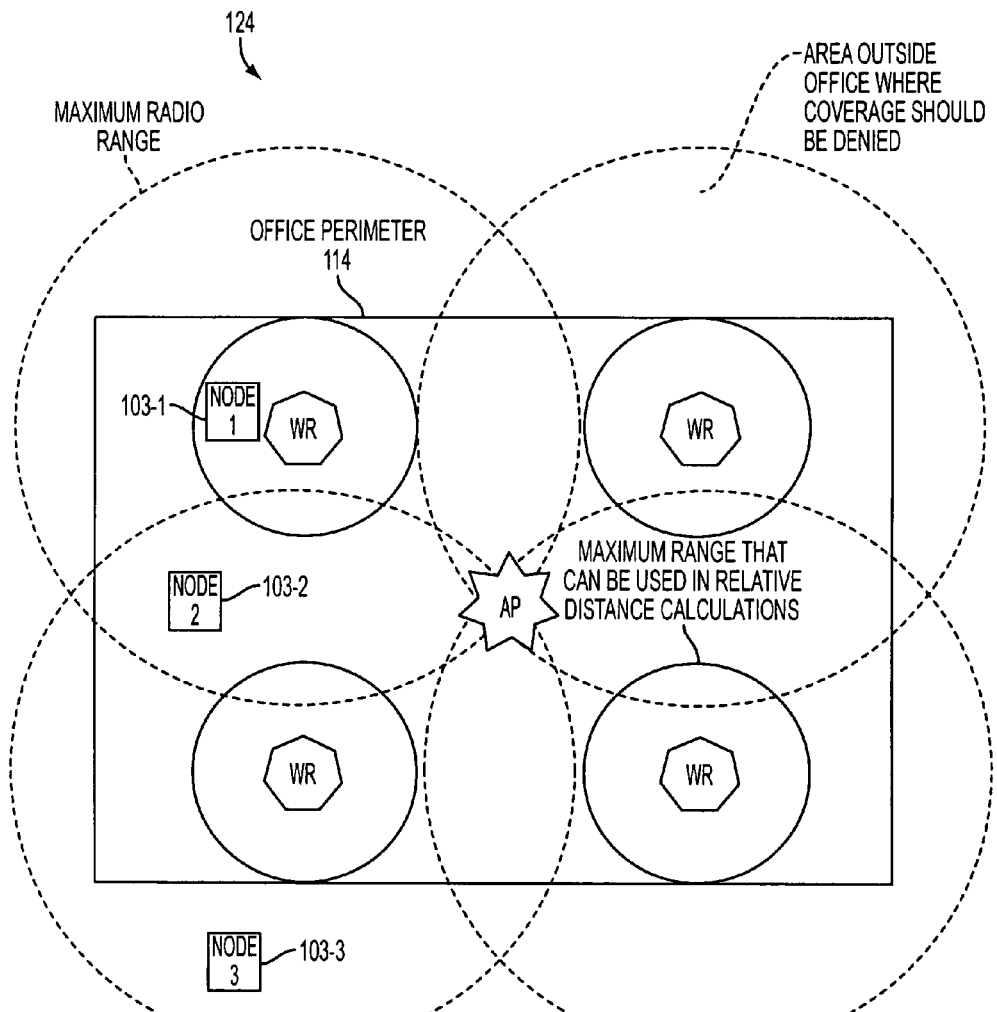
FIG. 6 is a diagram illustrating an example location of several mobile nodes which are within radio range of the wireless network in FIG. 4 in accordance with an embodiment of the present invention.
Figure 7:
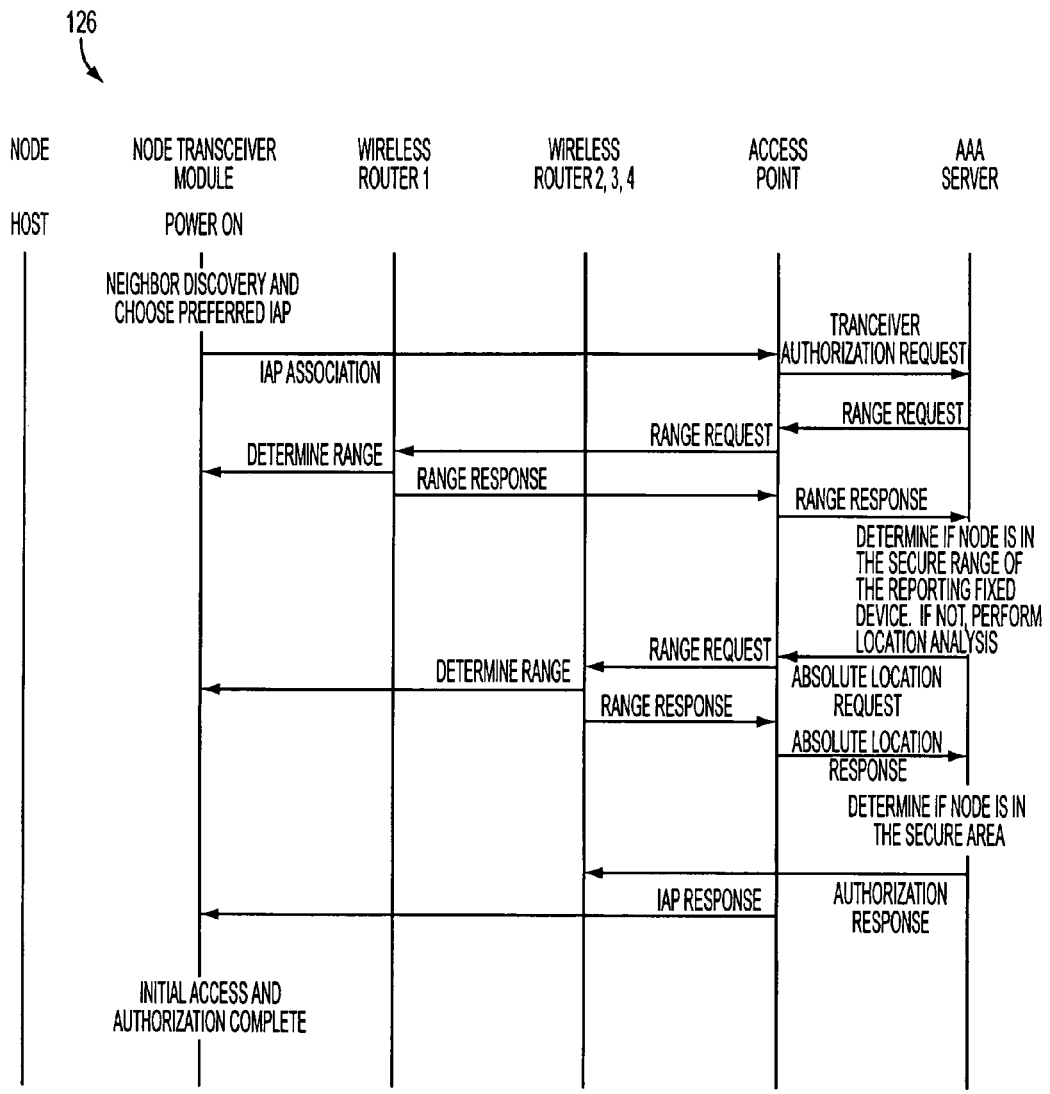
FIG. 7 is a ladder diagram illustrating an example of the flow of messages between devices during the authorization process in accordance with an embodiment of the present invention.

The ladder diagram 126 of FIG. 7 shows an example of the process flow that occurs for one embodiment of the present invention. Using the coverage graph 124 of FIG. 6 as an example, the process flow of FIG. 7 may be used to accurately locate mobile nodes requesting access and restrict network access based upon improper node location. Referring to FIGS. 6 and 7, the restricted access process of the embodiment of the present invention begins when a mobile node, such as node 103-2, powers up and the transceiver 106 of the node chooses a path to an access point 101, such as via the wireless router 102-1. The mobile node 103-2 sends a request to join the wireless network 100 and the wireless router 102-1 passes the message to the access point 101, which in turn passes the message to the Authentication, Authorization and Accounting (AAA) server 105.

As part of the authentication process, the AAA server 105 sends a message to the access point 101 requesting the range information of the mobile node 103-2, such as the location of the wireless router 102-1, and the distance between wireless router and the mobile device 103-2. The access point 101 receives the message from the AAA server and sends a request to the wireless router 102-1 to determine the distance between the mobile device 103-2 and the wireless router 102-1. The wireless router 102-1 executes a series of measurements, such as time of flight measurements, and determines the requested distance information, which is then sent to the AAA server 105 via the access point 101. The AAA server then calculates a position for the mobile node 103-2 and determines if the mobile node is within a secure zone 118-1, that is, within a zone in which network access by mobile nodes is allowed.

If the mobile node 103-2 is not found within the secure zone 118-1 by measurements provided by the wireless router 102-1, the AAA server 105 sends a request for an "absolute position" determination to the access point 101. The access point then requests neighboring wireless routers, such as 102-2, 102-3 and 102-4, to determine the distance between mobile node 103-2 and each wireless router 102-2, 102-3 and/or 102-4 respectively. In addition, the access point 101 may also determine the distance between the mobile node 103-2 and the access point 101. Each wireless router executes a series of measurements, such as time of flight measurements, and determines the requested distance information, which is then sent to the access point 101.

Upon receiving the additional distance information, the access point 101 calculates the absolute position of the mobile node 103-2 and sends the result to the AAA server 105. The AAA server 105 evaluates the absolute position of the mobile node 103-2 and determines if the mobile node is within the perimeter 114, and if so, sends a response to the original request for access from the wireless router 102-1 to allow the mobile node 103-2 to join the network on the basis of location.

There can be variations to the process flow in FIG. 7. For example, in another embodiment of the present invention, the AAA server 105 may request an absolute location without previously requesting the range information. The AAA server 105 may perform the calculations to determine if the mobile node 103 is in the secure zone, or it may send the information to an agent and subsequently use the agent's response. In each embodiment, the AAA server requests and receives location information and uses the location information received as part of the decision to provide service to the node.

In embodiments of the invention described above, security is maintained as the mobile nodes 103 cannot "spoof" the time of flight measurement used, since any attempt at processing the message would only delay the signal's return and effectively cause a greater distance to be calculated. Likewise, the mobile nodes 103 cannot provide an erroneous location since it they never queried for a self-determined location. All location determinations are done by infrastructure devices under control of the network.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined.

What is claimed is:

1. A method for restricting network access between nodes in an ad-hoc communications network, said nodes being adapted to transmit and receive signals to and from other nodes in said ad-hoc network, the method comprising:

controlling a first node in said ad-hoc communications network to receive a request for network access from a second node and in response, controlling at least one node in said network to calculate a location of said second node;

controlling said first node to allow said second node to have access to said network if said location of said second node is within a network access restriction boundary;

controlling said first node to communicate said request for network access to a third node; and controlling said third node to communicate to said first node a request for said location calculation of said second node and in response, controlling said first node to calculate said location of said second node and communicate said location to said third node.

2. A method as claimed in claim 1, further comprising:

calculating said locution of said second node based on at least one of a time of flight calculation, a known location of said first node and a known location of said at least one node.

3. A method as claimed in claim 2, further comprising:

calculating said known location of said first node and said at least one node based on at least one of manual position entry, global positioning, differential navigation and triangulation.

4. A method as claimed in claim 1, wherein said at least one node includes said first node.

5. A method as claimed in claim 1, wherein said third node is coupled to a network operations center.

6. A method as claimed in claim 1, wherein said third node includes an authentication, authorization and accounting server.

7. A method as claimed in claim 1, further comprising:

controlling said third node to control said first node to allow said second node to have access to said network if said location of said second node is within said network access restriction boundary.

8. A method as claimed in claim 1, wherein:

said network access restriction boundary is independent of a transmission range of said first node.

9. A method as claimed in claim 1, wherein:

said ad-hoc communications network is a wireless peer-to-peer ad-hoc communications network, said second node is a mobile node, and said location is an absolute location of said second node.

10. A method for restricting network access between nodes in an ad-hoc communications network, said nodes being adapted to transmit and receive signals to and from other nodes in said ad-hoc network, the method comprising:

controlling a first node in said ad-hoc communications network to receive a request for network access from a second node and in response, controlling at least one node in said network to calculate a location of said second node;

controlling said first node to allow said second node to have access to said network if said location of said second node is within a network access restriction boundary;

controlling said first node to communicate said request for network access to a third node;

controlling said third node to communicate a request for an absolute location of said second node to said first node of said ad-hoc communications network and in response, controlling said first node to calculate said absolute location and communicate said absolute location to said third node; and controlling said third node to control said first node to allow said second node to have access to said network if said absolute location of said second node is within said network access restriction boundary.

11. A method as claimed in claim 10, further comprising:

controlling said first node to calculate said absolute location of said second node based on said known location of at least one node of said network and a calculated location of said second node relative to said at least one node.

12. A system, adapted to restrict network access between nodes in an ad-hoc communications network, said nodes being adapted to transmit and receive signals to and from other nodes in said ad-hoc network, the system comprising:

a first node in said ad-hoc communications network, adapted to receive a request for network access from a second node and in response, to calculate a location of said second node;

said first node being further adapted to allow said second node to have access to said network if said location of said second node is within a network access restriction boundary;

said first node is further adapted to communicate said request for network access to a third node; and said third node is adapted to communicate to said first node a request for said location calculation and in response, said first node is further adapted to calculate said location of said second node and communicate said location to said third node.

13. A system as claimed in claim 12, wherein:

said first node is further adapted to calculate said location of said second node based on at least one of a time of flight calculation, a known location of said first node and a known location of at least one node.

14. A system as claimed in claim 13, wherein:

said first node is further adapted to calculate said known location of said first node and said at least one node based on at least one of manual position entry, global positioning, differential navigation and triangulation.

15. A system as claimed in claim 12, wherein said at least one node includes said first node.

16. A system as claimed in claim 12, wherein said third node is coupled to a network operations center.

17. A system as claimed in claim 12, wherein said third node includes an authentication, authorization and accounting server.

18. A system as claimed in claim 12, wherein:

said third node is further adapted to control said first node to allow said second node to have access to said network if said location of said second node is within said network access restriction boundary.

19. A system as claimed in claim 12, wherein:

said network access restriction boundary is independent of a transmission range of said first node.

20. A system as claimed in claim 12, wherein:

said ad-hoc communications network is a wireless peer-to-peer ad-hoc communications network, said second node is a mobile node, and said location is an absolute location of said second node.

21. A system, adapted to restrict network access between nodes in an ad-hoc communications network, said nodes being adapted to transmit and receive signals to and from other nodes in said ad-hoc network, the system comprising:

a first node in said ad-hoc communications network, adapted to receive a request for network access from a second node and in response, to calculate a location of said second node;

said first node being further adapted to allow said second node to have access to said network if said location of said second node is within a network access restriction boundary;

said first node is further adapted to communicate said request for network access to a third node;

said third node is further adapted to communicate a request for an absolute location of said second node to said first node of said ad-hoc communications network and in response, said first node is further adapted to calculate said absolute location and communicate said absolute location to said third node; and said third node is further adapted to control said first node to allow said second node to have access to said ad-hoc communications network if said absolute location of said second node is within said network access restriction boundary.

22. A system as claimed in claim 21, wherein:

said first node is further adapted to calculate said absolute location of said second node based on said known location of at least one node of said network and a calculated location of said second node relative to said at least one node.

23. A computer-readable medium of instructions, adapted to restrict network access between nodes in an ad-hoc communications network, said nodes being adapted to transmit and receive signals to and from other nodes in said ad-hoc network, comprising:

a first set of instructions, adapted to control a first node in said ad-hoc communications network to receive a request for network access from a second node and in response, to calculate a location of said second node, and said first set of instructions being further adapted to control said first node to communicate said request for network access to a third node;

a second set of instructions, adapted to control said first node to allow said second node to have access to said network if said location of said second node is within a network access restriction boundary; and a third set of instructions, adapted to control said third node to communicate to said first node a request for said location calculation and in response, said first set of instructions is further adapted to control said first node to calculate said location of said second node and communicate said location to said third node.

24. A computer-readable medium of instructions claimed in claim 23, wherein:

said first set of instructions is further adapted to control said first node to calculate said location of said second node based on at least one of a time of flight calculation, a known location of said first node and a known location of at least one node.

25. A computer-readable medium of instructions as claimed in claim 24, wherein:

said first set of instructions is further adapted to control said first node to calculate said known location of said first node and said at least one node based on at least one of manual position entry, global positioning, differential navigation and triangulation.

26. A computer-readable medium of instructions as claimed in claim 23, wherein:

said second set of instructions is further adapted to control first node to allow said second node to have access to said network if said location of said second node is within said network access restriction boundary.

27. A computer-readable medium of instructions as claimed in claim 23, wherein:

said third set of instructions is further adapted to control said third node to communicate a request for an absolute location of said second node to said first node of said ad-hoc communications network and in response, said first set of instructions is further adapted to control said first node to calculate said absolute location and communicate said absolute location to said third node; and said second set of instructions is further adapted to control first node to allow said second node to have access to said network if said absolute location of said second node is within said network access restriction boundary.

28. A computer-readable medium of instructions as claimed in claim 27, wherein:
said first set of instructions is further adapted to control said first node to calculate said absolute location of said second node based on said known location of at least one node of said network and a calculated location of said second node relative to said at least one node.

29. A computer-readable medium of instructions as claimed in claim 23, wherein:

said network access restriction boundary is independent of a transmission range of said first node.

30. A computer-readable medium of instructions as claimed in claim 23, wherein:

said ad-hoc communications network is a wireless peer-to-peer ad-hoc communications network, said second node is a mobile node, and said location is absolute location of said second node.

* * * * *